United States Patent
Sahani et al.

(10) Patent No.: US 11,588,904 B2
(45) Date of Patent: Feb. 21, 2023

(54) MANAGEMENT OF CONTEXTUAL DEVICE NOTIFICATIONS WITH VIP RANKINGS

(71) Applicant: VMware, Inc., Palo Alto, CA (US)

(72) Inventors: Hemant Sahani, Palo Alto, CA (US); Ian Ragsdale, Atlanta, GA (US); Adam Cianfichi, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 151 days.

(21) Appl. No.: 17/234,288

(22) Filed: Apr. 19, 2021

(65) Prior Publication Data

US 2021/0243270 A1    Aug. 5, 2021

Related U.S. Application Data

(63) Continuation of application No. 16/237,765, filed on Jan. 2, 2019, now Pat. No. 10,986,205.

(51) Int. Cl.
*H04L 67/306* (2022.01)
*H04L 51/42* (2022.01)
*H04L 51/224* (2022.01)

(52) U.S. Cl.
CPC .......... *H04L 67/306* (2013.01); *H04L 51/224* (2022.05); *H04L 51/42* (2022.05)

(58) Field of Classification Search
CPC ....... H04L 67/306; H04L 51/22; H04L 51/24; G06F 16/285; G06F 16/24578
USPC .......................................................... 709/206
See application file for complete search history.

(56) References Cited

U.S. PATENT DOCUMENTS

| | | | | |
|---|---|---|---|---|
| 2006/0235933 A1* | 10/2006 | Baluja | ............... | H04L 51/226 709/207 |
| 2010/0077041 A1* | 3/2010 | Cowan | ............... | G06Q 10/107 709/206 |
| 2013/0041968 A1* | 2/2013 | Cohen | ............... | H04L 51/226 709/206 |
| 2015/0302338 A1* | 10/2015 | Zaveri | ............... | H04L 67/1001 705/7.39 |
| 2017/0371532 A1* | 12/2017 | Panchapakesan | ....... | H04L 67/30 |

FOREIGN PATENT DOCUMENTS

WO    WO 0193515    12/2001

* cited by examiner

*Primary Examiner* — Tan Doan
(74) *Attorney, Agent, or Firm* — Clayton, McKay & Bailey, PC

(57) ABSTRACT

Examples described herein include systems and methods for management of contextual notifications on user devices. Entities can be categorized as VIP status based on scoring profiles sent from a management server to the user device. Applications on the user device can implement an SDK that reads the profiles and sets certain actions to boost scores and others to reduce scores. These local VIP scores can be sent periodically from the user device to the management server. The management server can use them in conjunction with global VIP scores for the same entities to create aggregated VIP information. This can be sent back to the user device, allowing the user device to then visualize different notifications or workflows based on whether an entity's aggregated VIP information exceeds one or more thresholds.

20 Claims, 5 Drawing Sheets

MANAGEMENT OF CONTEXTUAL DEVICE NOTIFICATIONS WITH VIP RANKINGS

This application is a continuation of U.S. patent application Ser. No. 16/237,765, titled "MANAGEMENT OF CONTEXTUAL DEVICE NOTIFICATIONS WITH VIP RANKINGS," and filed Jan. 2, 2019, which is incorporated herein in its entirety for all purposes.

BACKGROUND

Notifications area common feature of most modern applications that execute on a user device, such as a phone or tablet. Although these are designed to notify the user of a relevant event or potential action, the sheer number of notifications can be overwhelming. Within the work context, a constant stream of emails, texts, appointments, edits, and other activities can result in notifications losing their usefulness. Paradoxically, the notifications can become distractions that the user attempts to ignore.

Although some application and operating system ("OS") features allow the user to turn notifications on or off, these features often lack intelligence and leave the user in an all-or-nothing bind. For example, turning off email notifications can cause the user to miss an important email, whereas leaving the notifications on can likewise cause the user to ignore a notification of an important communication.

Additionally, attempts to solve this problem have been limited in their ability to consider user actions across multiple applications. A user's activities in one application are not easily transferable or understandable in another application, limiting each application's potential intelligence in discerning which notifications to surface.

Similarly, user workflows have been largely static and unrelated to the importance of a particular event or communication. For example, an email relating to information controlled by a second application can cause a workflow to surface an interface for that application. However, when a user receives many such emails, it may actually serve as a distraction to constantly deal with the interface surfaced by the workflow.

Consequently, a need exists for a system that manages contextual device notifications. Particularly, a need exists for a system that performs this management based on very important person ("VIP") scores.

SUMMARY

Examples described herein include systems and methods for managing contextual device notifications using VIP scores. A management server can provide a console that allows an administrator to define a scoring profile. The scoring profile can be used to rank or score individuals for a user such that VIPs can be determined for each user. The VIP score can be aggregated from local VIP scores calculated on the user device and global VIP scores obtained from external sources or information at the management server. The user device can be any processor-based device, such as a cell phone, tablet, or laptop associated with the user.

The console can be a graphical user interface ("GUI"). The scoring profile can include boost actions and detract actions. A boost action can be an activity that increases a score of an entity with respect to a user and a detract action can decrease that score. Entities scored with respect to a user can include individuals, processes, email addresses, and applications. VIP scores can be determined for each entity with respect to a user.

In one example, the management server can send the boost and detract actions to the user device. These can be used by at least an email application and a second application to create local VIP scores. Both applications can execute on a user device and implement a software development kit ("SDK") to interface with an application programmable interface ("API") of the management server. The SDK can allow the applications to read the scoring profile and implement the corresponding boost and detract actions. Different profiles, including different boost and detract actions, can be sent to the two applications in one example.

The user device can periodically send local VIP scores back to the management server for use in creating aggregate VIP scores. The local VIP scores from the email application and second application can be based on the boost and detract actions that occur in those applications. In one example, the management server can determine identities of the entities associated with the local VIP scores. This can include matching contact information, such as an email address, with an identity that is used elsewhere on the system, such as in a different application, or even at an external third party. The management server can store the local VIP scores along with global VIP scores received from other devices. Based on aggregation rules, which can be set by an administrator in an example, the management server can then create aggregated VIP information using both the local and global VIP scores. The management server can rely on an identity provider to determine when various VIP scores actually apply to the same entity, for example, based on the entity using multiple different aliases across different systems and applications.

The management server can then send the aggregated VIP information to the user device for governing which notifications to present on the user device. This can include sending the aggregated VIP information to specific applications on the user device. Alternatively, aggregated VIP information can be sent to an application server that applications on the user device interact with. In one example, the scoring profile can include the aggregated VIP information. Thresholds for determining whether an entity qualifies as a VIP can be defined in the scoring profile, in an application, by a management agent, or even by the OS, in various examples. In one example, a first threshold score establishes a VIP, and a second threshold score establishes a very VIP ("VVIP"). The user device or application server can take different actions based on whether information received from an entity meets the VIP or VVIP thresholds. Examples below may refer to user devices that utilize the VIP information, but these also can apply to application servers that use VIP information for notification and workflow decision making.

The examples summarized above can each be incorporated into a non-transitory, computer-readable medium having instructions that, when executed by a processor associated with a user device, cause the processor to perform stages for managing firmware on a group of user devices enrolled in an EMM system. It can also be implemented in a system or as a method executed by one or more processors.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for contextual notification management using VIP scores. The system can include a management server that stores scoring profiles. The scoring profiles can include boost and detract actions that are interpreted by an SDK. The SDK can be implemented by one or more applications on a user device. The SDK can allow those applications to determine local VIP scores at the user device for various entities with which the user interacts. For example, email contacts can identify the entities associated with the local VIP scores. When a user takes certain actions and inactions toward emails, these local VIP scores can be manipulated as defined in the scoring profile. In one example, when the user reads an email, the email application can add points to a score for the sending entity, whereas deleting the email without reading it can reduce points for that entity. These scores can be local VIP scores that the applications send to the management server, as specified by the SDK.

The management server can receive the local VIP scores and attempt to identify the associated entities. By doing so, the management server can then locate additional global VIP scores for those entities. Global VIP scores can be VIP scores not generated at the user device. These can be prior aggregations of local VIP scores from various applications or can include VIP scoring from external applications, servers, or other user devices. Using the local VIP scores and global VIP scores, the management server can create aggregated VIP information. This can be sent back to the user device, such as to the same applications implementing the SDK. When these applications identify content related to an entity, the applications can decide whether to notify the user based on whether the entity's aggregated VIP information exceeds one or more thresholds. These thresholds may be static (e.g., where a value exceeds a certain number) or dynamic (e.g., where a value represents a percentile). Similarly, the application can provide different workflows based on whether the thresholds are exceeded. In this way, the applications can both use and impact changes to the VIP scores in a feedback loop with the management server.

Systems for contextual notification management can reduce distractions and increase work effectiveness, in an example. By intelligently determining which notifications are most important to a user, the user can be presented with important notifications while being spared the less important notifications. Additionally, the system can contextualize the notification so that the user workflow is more efficient, in an example.

Figure 1:
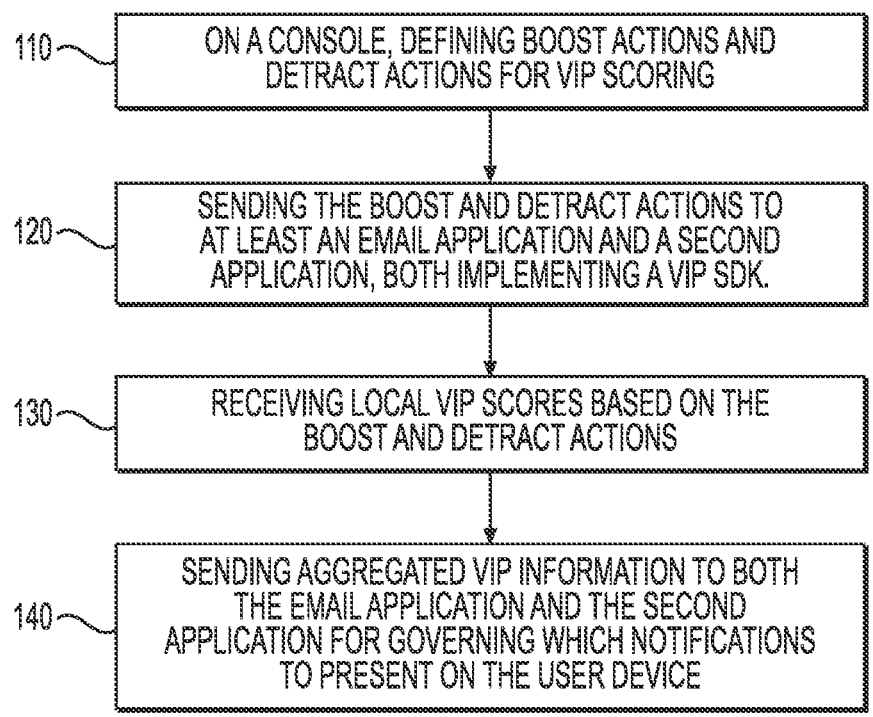
FIG. 1 is a flowchart of an exemplary method for contextual notification management.

FIG. 1 is an example method for contextual notification management. At stage 110, a console can provide options for defining boost actions and detract actions for use in VIP scoring. VIP scoring can be a method of scoring or ranking the importance of entities with respect to a user. The system can perform VIP scoring for multiple users such that each user has its own set of VIP scores. Boost actions can be any activity or event that causes a score to increase with respect to an entity. The score can indicate the entity's ranking relative to the other entities or can be an independent point total. Detract actions can be any activity or event that causes the score to decrease with respect to the entity. In general, boost actions can be used to increase visibility of content and messages associated with entities that the user works with regularly. Similarly, detract actions can generally be used to reduce visibility of content and messages associated with entities that the user tends to ignore.

In one example, the boost and detract actions are defined as part of VIP scoring profiles. An administrator can edit the VIP scoring profiles by using a console that communicates with a management server. These VIP scoring profiles can be maintained on the management server. In one example, the console is also generated by the management server. The console can allow administrators to perform tasks in an EMM system, such as managing groups of users and setting permissions for those users. The VIP scoring profiles can be created for particular applications, users, and user groups. For example, the administrator can create a boost or detract action that includes an event and a scoring change amount. The console can include an option to assign the boost or detract action to a VIP scoring profile. The console can also include an option to assign the VIP scoring profile to a user, user group (e.g., executives or sales groups), or to particular applications or groups of applications.

Boost and detract actions can be defined and implemented at applications based on a common SDK framework. For example, events can be defined by the SDK to either add or subtract points for the entity. Applications implementing the SDK can track and modify local VIP scores that can evolve based on the user's actions. The applications or OS can then use the VIP scores (local or aggregate) to determine functions to perform, such as which notifications to surface, which old messages to delete, and other functions.

The console can allow the administrator to select a type of VIP event, such as "number of emails marked unread," set a threshold, and set an associated score change. As one example, one or more boost actions can be defined based on the speed with which a user responds to a message. Thresholds can be set, such as at 20, 40, 60, 90, and 180 seconds—each of which can correspond to increasing the local VIP score of for the entity that sent the message. Other boost actions can be based on a management hierarchy, such as boosting the VIP score of a manager, direct report, or the user's manager's manager. The various hierarchical relationships can be given different point values such that the entities start with a baseline increase to their respective VIP score for the user. An example detract action can include deducting the local VIP score when a user deletes email without reading it within a time threshold, such as thirty seconds. Another example can include not responding to an email or text within a time threshold, such as two days. Those detract actions can deduct from the user's VIP score (local or aggregate) for the sender entity.

At stage 120, the management server can send the boost and detract actions to the user device for implementation. This can include determining which user devices should receive the boost and detract actions. For example, the management server can maintain records regarding which applications are installed on which user devices. The boost and detract actions can be sent to user devices that currently include applications that make use of the boost and detract actions.

The user device can include an email application and a second application. The email application can be an email client, such as VMWARE's BOXER or MICROSOFT OUT-LOOK. The second application can be any other application, such as a word processing or content creation application. The email application and the second application can each implement a VIP SDK. The VIP SDK can include methods for performing boost and detract actions within an application. The VIP SDK can also include functions for tracking local VIP scores for various entities and receiving current aggregate VIP scores from the management server. The VIP SDK can further include VIP and VVIP thresholds that applications or the OS can use in determining when to consider an entity a VIP or VVIP. VIP and VVIP classification can be used to dictate device operation, such as determining which items to display or delete. The VIP SDK can be an SDK used for EMM management in one example. The VIP scoring can be just one part of the VIP SDK, and the VIP SDK can more broadly related to providing EMM functionality for an application, in an example.

The boost and detract actions sent to the email application and second application can vary. In one example, some of these actions can be implemented by the email application and not the second application, and vice versa. For example, a boost action related to response quickness can be implemented by the email applications. The second application can implement a boost action related to edits to the user's document by some other entity. Some actions can be implemented by both applications.

The management server can send the boost and detract actions to the user device as part of a VIP scoring profile. The VIP scoring profile can indicate which applications particular actions apply to, in an example. In one example, the VIP scoring profile can be part of a larger EMM profile that includes other EMM-related definitions as well, such as compliance rules and instructions for implementation at the user device. In one example, the VIP scoring profile is a JSON or XML file.

In performing the boost and detract actions, the applications can track local VIP scores for multiple entities. The amount of points added and subtracted can be defined by the VIP profile in conjunction with the VIP SDK. The scores can be stored locally in a data file, such as a data file including a table with entities and corresponding VIP scores.

At stage 130, the management server can receive the local VIP scores. The VIP SDK can cause the user device to report these local VIP scores to the management server. This can be done periodically or when an application opens, closes, or transitions from the background of the OS to the foreground. The VIP SDK can include an address, such as a uniform address locator ("URL"), for contacting the management server. The user device can supply credentials that identify the user device. This can allow the management server to contextualize the local VIP scores received from the user device, as elaborated on below.

In one example, the management server can aggregate the local VIP scores with other relevant information, to create aggregated VIP information. For example, local VIP scores received from other applications and devices associated with the user can all be combined together, in an example. Overlapping entities can exist for the local VIP scores from the email application and the second application. These scores can be combined, such as by summing, averaging, or by taking a maximum or minimum, to create aggregated VIP information. Based on multiple sources, the aggregated VIP information can provide a more wholistic outlook of the importance of an entity with respect to the user or to an organizational overall.

The aggregated VIP information can also include information from multiple devices, allowing the management server to update each of those devices with aggregated VIP information that considers a fuller range of interactions. For example, the user can work on a laptop, and the various local VIP scores can be sent from the laptop to the management server. Then, when the user works on their phone, the phone can receive VIP scores from the management server. This can give the second device (e.g., the phone) the advantage of the VIP scores determined on the first device (e.g., the laptop). Alternatively, the aggregated VIP information can be constructed from VIP scores from both the first and second devices. Then this aggregated VIP information can be sent to both devices, allowing each to take advantage of the machine learning of the other.

The management server can also receive global VIP scores from sources other than the user device, such as from servers and third-party applications. For example, the management server can receive global VIP scores from an email server or a version control application running at a backend repository. These third-party devices and applications can also implement the VIP SDK to receive boost and detract actions and report global VIP scores. The global VIP scores from third-party devices and applications can be incorporated into the aggregate VIP information. The management server can also receive hierarchy information that can be converted into VIP scores. For example, the management server can receive an organizational chart of an organization or business group. The organizational chart can be used to assign or modify VIP scores based on an entity's position on the chart.

In one example, the local VIP scores identify entities based on contacts, such as an email address or a messaging handle. The management server can then match the contacts of the local VIP scores to identities retrieved from an identity management service. The identity management server can run on the same or different server as the management server. In one example, the identity service is used for single sign-on ("SSO") and can retrieve one or more matching identities based on the contact. These identities can then be used to create the aggregate VIP scores by combining local VIP scores for the contacts with local or global VIP scores for the identities.

At stage 140, the management server can send aggregated VIP information to the user device for use at the email application and second application. The aggregated VIP information can act as a baseline to which local VIP scores can be incorporated, in an example. The combined VIP information can be compared against one or more thresholds to determine what content to display to the user. For example, when an email is received, the email application can determine whether a notification is warranted based on comparing the aggregated or combined VIP information against a score threshold. Alternatively, a ranking threshold can be used, ensuring that only a fixed number of entities can qualify for notifications. The second application can also have rules in place to determine which notifications to surface based on the aggregate or combined VIP scores.

In one example, the user can configure the threshold scores or rankings for notifications and other workflow features. For example, a VIP rank can be set as 90 percentile (relative to a group of entities relevant to the user) in the email application or second application. Additionally, thresholds can be set for during off hours or do-not-disturb hours. For example, a VVIP rank may be required during those times in order for a notification to be presented to the user.

Applications can also use the VIP rank or VVIP rank to modify workflows at the user device. For example, above a threshold VIP score, a smart folder can display that contains documents or messages from a VIP or VVIP entity. Additionally, a panel can state the number of unaddressed items (e.g., emails or tasks) from VIPs in the last week. The email application can present a VIP inbox in one example, only containing messages from entities with aggregate or combined VIP information above the VIP rank threshold. Third party applications can similarly leverage the VIP rank to show a smart channel or a bot that indicates VIP threads or messages. In one example, a digital assistant, such as ALEXA, can use VIP rank to determine when to notify a user and provide other contextual content. For example, the digital assistant can compare the aggregate VIP information against a threshold or ranking to determine whether to notify the user of incoming messages, such as email, instant messages, texts, and posts. As yet another example, a connected car can read messages from VIP entities with a command instead having to read through all of a user's emails.

Figure 2:
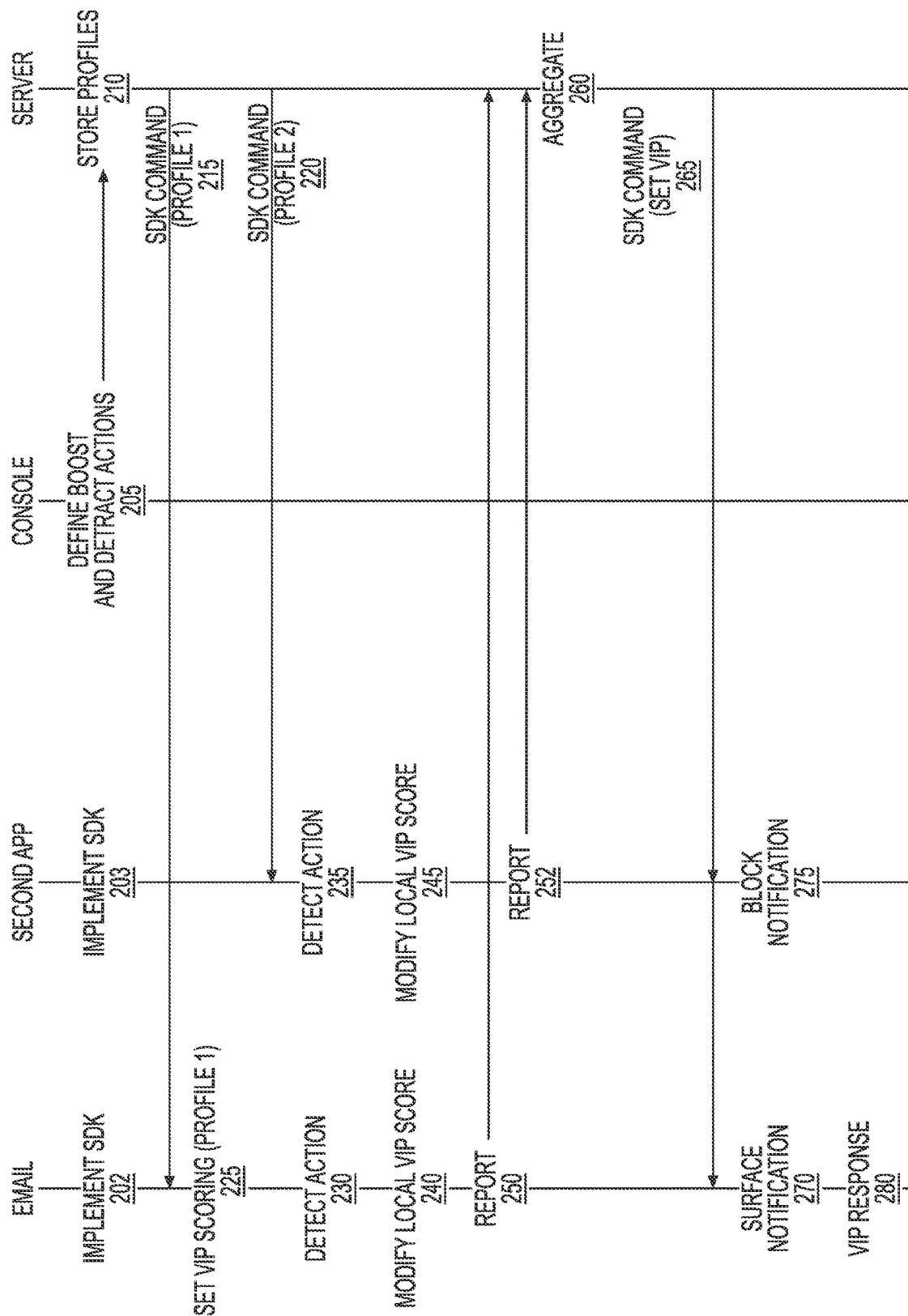
FIG. 2 is an exemplary sequence diagram for contextual notification management.

FIG. 2 is a sequence diagram of example method for contextual notification management. At stage 202, the email application can implement the VIP SDK. When the email application executes, it can include methods and functions contained in the VIP SDK. The VIP SDK can allow the email application to perform boost and detract actions based on a VIP scoring profile. The VIP SDK can control local VIP scoring, determination of VIP entities, and perform actions differently when a VIP or VVIP entity is involved. The second application can likewise implement the VIP SDK at stage 203.

At stage 205, a console can provide options for defining boost and detract actions. The console can be part of a GUI of an EMM system, such as a GUI accessed through a web browser that connects to a management server. An administrator can use the console to create a boost or detract action by selecting one of multiple predefined actions, in an example. For some actions, the administrator can define a threshold for when the boost or detract action applies. The administrator can also define a point value to add or deduct. The created actions can then be added to one or more VIP scoring profiles. The VIP scoring profiles can be defined for particular applications in one example. Alternatively, they can be assigned to users or user groups.

The management server can store the VIP scoring profiles at stage 210. The VIP scoring profiles can be stored on a physical memory accessible by the management server. The VIP scoring profiles can be part of a database containing tables. The tables can track which boost and detract actions correspond to which VIP scoring profiles. The tables can also track aggregate VIP information for various entities with respect to a user. In one example, a minimum score is needed to keep the record in the database.

At stage 215, the management server can send a first VIP scoring profile to the user device for use with the email application. In one example, the management server does so by making a call to the VIP SDK. The VIP SDK can be part of the email application. Alternatively, it can be part of the OS or some other application, such as a VIP agent on the user device. In response to the call, the email application can set itself to use the first VIP scoring profile at stage 225. This can include setting the email application to use the boost and detract actions in the first VIP scoring profile.

At stage 220, the management server can send a second VIP scoring profile to the user device for implementation by the second application. The VIP SDK of the second application can cause the second application to begin using the boost and detract actions defined in the second VIP scoring profile.

At stage 230, the email application can detect a boost or detract action. For example, the user may quickly respond to an email from a co-worker, triggering a detect action. At stage 240, the VIP SDK of the email application can modify a local VIP score with respect to the co-worker, such as by adding points to the co-worker's VIP score based on the user responding to the co-worker's email within a time period, such as five minutes. Similarly, at stage 235, the second application can detect a boost or detract action. For example, the second application can detect that the user is editing a document authored by another entity and increase the local VIP score with respect to that entity at stage 245.

At stages 250 and 252, the applications can report their local VIP scores to the server. In one example, the reported local VIP scores can include just the changes to the VIP scores that occurred locally since the local VIP scores were last reported or since the aggregated VIP information was last received. The reporting can be done periodically in one example. Alternatively, the local VIP scores can be reported in real time in one example. The VIP scoring profiles can dictate what events or time thresholds cause the applications to report the local VIP scores in one example. To report the local VIP scores, the VIP SDK can authenticate the user device with the management server. In one example, the VIP SDK can report local VIP scores from other applications that also implement the VIP SDK. For example, the email application can check with other applications on the user device and receive their local VIP scores. This can be done as part of a broadcast and handshake process controlled by the VIP SDK.

At stage 260, the management server can aggregate VIP scores to create aggregated VIP information. This can include combining local VIP scores received from the user device with global VIP scores. The global VIP scores can be VIP scores received from other devices or VIP scores tracked independently on the management server itself. For example, a VIP scoring profile on the management server can award points based on an organization hierarchy, such that a user's boss is given VIP points.

The aggregation can include summing the total local and global VIP points in an example. Alternatively, it can include ranking entities based on total VIP points. In this example, the aggregated VIP information can indicate entity rankings with respect to the user. The management server can apply any other aggregation model, such as a machine learning model, in other examples.

At stage 265, the management server can provide the aggregated VIP information to the user device. This can include sending an SDK command to one or both of the email application and the second application. This can cause the applications to use the aggregated VIP information to influence application functionality. For example, at stage 270, the email application can receive an email and check the aggregated VIP information for the sender entity. If the aggregated VIP information indicates a score or ranking above a threshold, the email application can surface a notification. This can include making a chime or visually presenting the notification, depending on the example. In one example, a higher threshold indicating a VVIP can cause the email application to surface a special notification, such as a special sound or graphic.

In still another example, at stage 280, the email application can respond in some other way to the aggregated VIP information. For example, a special tab with VIP or VVIP emails can be provided on the GUI, allowing the user to quickly access those items. Likewise, in the second application, a special VIP folder can contain recent files that represent collaborations between the user and VIPs or VVIPs.

Conversely, at stage 275, the second application may determine that a notification should be blocked. This can occur when the entity associated with the item requesting notification falls below a threshold VIP score or ranking.

Through the process of FIG. 2, the various applications and devices can both consume and generate VIP scores, creating a feedback loop that causes VIP scores to continuously update and change. The email application and second application can repeat the reporting stages 250, 252 on a regular basis. They can also report upon a local VIP score changing or based on the relevant application being launched or cycled from the background to the foreground of the operating system. The aggregation and SDK command at the management server, described in stages 260 and 265, can be repeated whenever a new report arrives from the user device.

As an additional example, a first user can receive an email from their manager and open it within 10 seconds. The email application, implementing VIP SDK at stage 202, can detect a boost action at stage 230. The boost action can be based on opening the email within a time threshold, such as 15 seconds. This can cause the first user's local VIP score for the manager to increase at stage 240. The manager's VIP score can also have 200 points by default based on the management server or VIP SDK determining that the manager is the user's superior. In this example, the user's aggregate VIP information for the manager can exceed a VIP threshold, causing a notification to appear prominently at the top of the email application, rather than in chronological order.

Continuing with this example, the same manager can send an email to a second user. The second user flags the email as junk without reading it, causing their email application to detect one or more detract actions at state 230. A first detract action for not reading the email can reduce the second user's local VIP score for the manager by 20 points. A second detract action for moving the email to junk can further reduce the VIP score by another 40 points. Meanwhile, the second user's aggregate VIP information can be lower than that of the first user if the manager is not a superior of the second user. In sum, the aggregate VIP information can fall below the VIP threshold, causing to special notification to occur with respect to the manager's email.

In another example, the second application can be JIRA or some other issue tracking software. Implementing the VIP SDK, the second application can boost local VIP scores when the user interacts with a ticket. For example, a boost action can increase a local VIP score for the user who created the ticket and also increase local VIP scores for other users that comment or collaborate on the ticket. The second application can also use the aggregate VIP information as a basis for determining whether to highlight or prioritize particular tickets. For example, a ticket having an individual user or combined multi-user VIP score above a VIP threshold can be presented in its own priority pane. As another example, an alternative workflow can be presented when the aggregate VIP information rises above the VVIP threshold, ensuring that the user will work on the ticket sooner than under a default workflow.

The second application (or a third application) can alternatively be a communication application, such as SKYPE. A boost action can increase a user's local VIP score when a call lasts beyond a duration threshold. Similarly, placing a call to a user can increase that user's local VIP score. A detract action can decrease a second user's local VIP score when the user of the device ignores or diverts a call. SKYPE can also operate differently for a VIP or VVIP user, such as by coming out of a "do not disturb" mode automatically, by using a different ringtone, or by messaging the user to alert them of missing the VIP or VVIP user's call.

In this way, aggregated VIP information can be formed based on scoring across multiple applications. Each application can report its own local VIP scores to the management server for use in creating aggregated VIP information that can be used by multiple VIP SDK-enabled applications. Ticket manipulation in JIRA and SKYPE calls can therefore impact email notification presentation, and vice versa.

Figure 3:
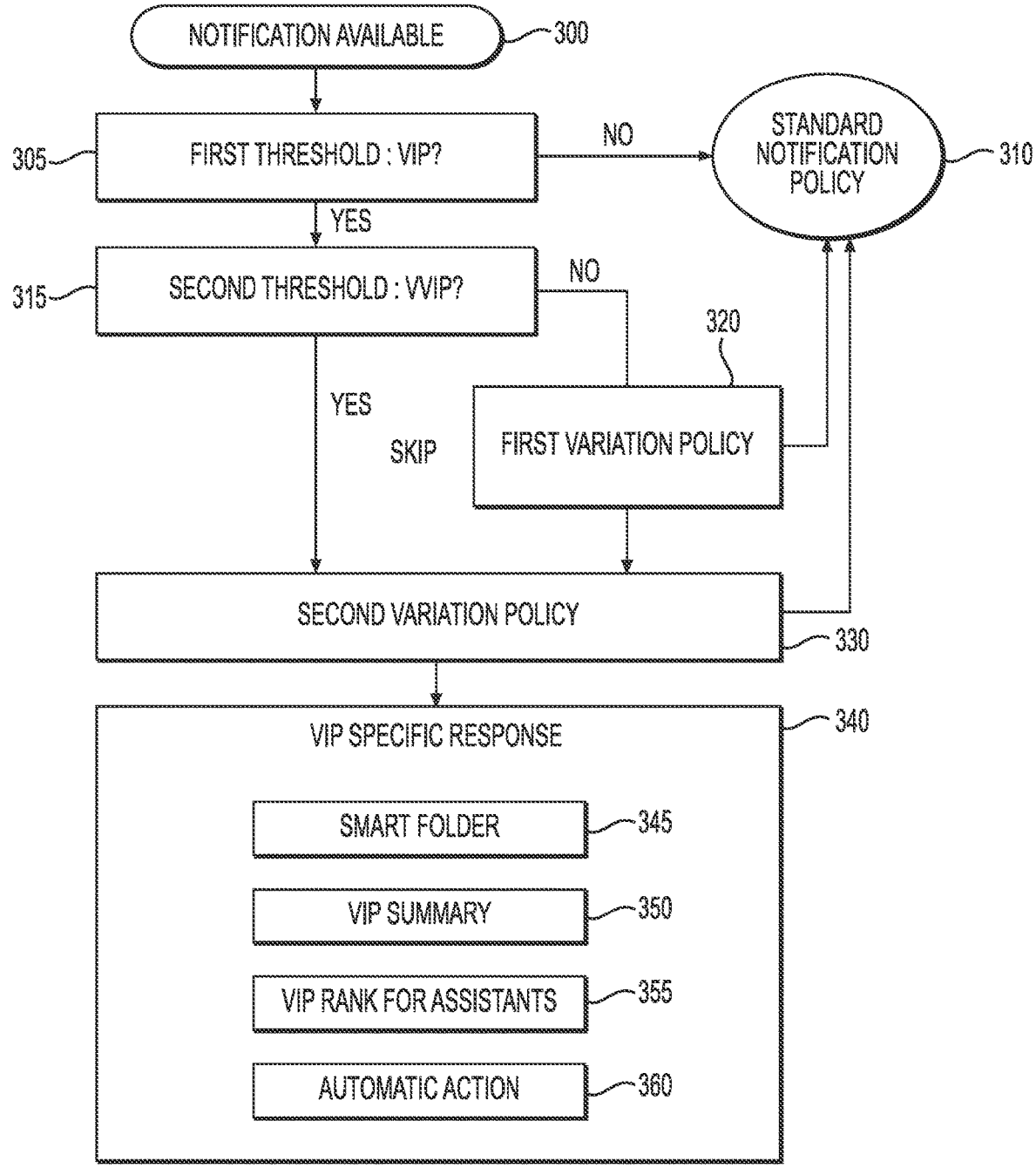
FIG. 3 is a flowchart of an exemplary method for contextual notification management.

FIG. 3 is another example flowchart. At stage 300, an application implementing the VIP SDK can detect that a notification is available. This can occur when an action occurs at the application, such as an email being received. Instead of immediately presenting the notification, various stages can be performed to ensure notification is warranted based on the local VIP scores or aggregated VIP information.

At stage 305, the application can determine whether an entity associated with the notification has a VIP score above a first threshold for VIPs. If not, a standard notification policy can be applied at stage 310. The standard notification policy can be one that exists in an application prior to implementation of the VIP SDK, in an example.

If the first threshold is satisfied, then at stage 315 the application can determine whether the entity's VIP score exceeds a second threshold for VVIPs. If not, then at stage 320 the application can determine that the entity is a VIP but not a VVIP. As a result, a first variation policy can be applied to the notification. This can mean that the notification gets presented differently than it would under the standard notification policy. Alternatively, it can include presenting the notification in some way that indicates a VIP entity, such as by highlighting or emphasizing the name of the VIP within the notification. In yet another alternative, the first variation policy can determine that even though the entity is a VIP, the standard notification policy should still apply.

If the second threshold is satisfied, then the entity can be considered a VVIP. At stage 330 a second variation policy for VVIPs can be applied. This can include a VIP specific response at stage 340. As an example, the application can create or update a smart folder 345 that contains contents related to VVIPs, VIPs, or just the particular VVIP. In another example, at stage 350 the application visualizes a special summary of information related to the notification. Further, at stage 355, the application can take a special action for virtual assistants. For example, a message can be sent to ALEXA or SIRI that causes the virtual assistant to announce or display something in connection with the notification. At stage 360, the application can take some other automatic action, such as sending a thank you email, providing the sender with an update regarding the user's whereabouts, or automatically adding a calendar entry without user approval.

Figure 4:
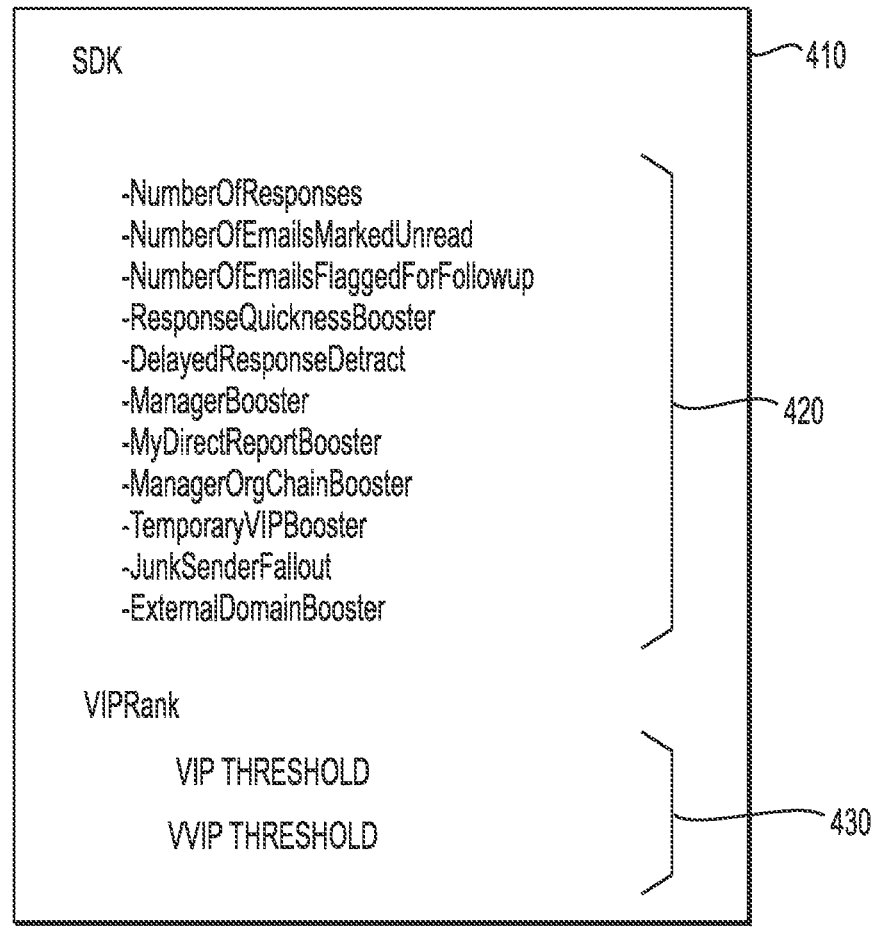
FIG. 4 is an exemplary illustration of a scoring profile for use with an SDK.

FIG. 4 is an example VIP scoring profile 410 used by the VIP SDK. The scoring profile 410 can be application specific in an example. The scoring profile can define one or more actions 420 that can be boost or detract actions. These actions 420 can be interpreted by the VIP SDK for implementation by the application. In one example, an action 410 can be defined as [BoosterAction or DetractAction] {[type]: [score]}, where the type and score are selected by an administrator at the console. For example, BoosterAction {FastReply: 100} can cause an application to award 100 VIP points when the user responds quickly to an entity's email, text, or other message.

Several example actions 420 are included in this example, but others are also possible. NumberOfResponses can be an action 420 that boosts a VIP score when exceeding a threshold or detracts from a VIP score when below a threshold. These thresholds can be numerous and also time sensitive. For example, NumberOfResponses can be used to define a boost action when a user responds to the same entity more than 5 times in a single day. The other actions 420 likewise can have multiple different thresholds and be time based.

NumberOfEmailsMarkedUnread can detract from a VIP score when above a threshold, such as when two or more emails from an entity are marked unread, or boost a VIP score when kept below a threshold, such as when less than two emails from an entity are marked unread. NumberOfEmailsFlaggedForFollowup can similarly modify an entity's VIP score based on how many emails flagged for follow up. If a user flags a threshold number of emails (or even a single one, in an example) the associated VIP score can be boosted for the entity related to the flagged emails.

ResponseQuicknessBooster can define boost and detract actions based on how long the user takes to respond to an entity. If the user responds within a threshold time, such as under one minute, the VIP score can increase. If the user waits, for example, multiple days, the VIP score can decrease. DelayedResponseDetract can alternatively be used to create the detract action. ResponseQuicknessBooster can boost or detract in a scaled manner. For example, a response within one minute of email receipt can produce a larger boost than a response occurring between one and two minutes. Similarly, a response sent five days after receipt can produce a larger detract action than a response sent two days after receipt.

ManagerBooster can boost VIP points for an entity that manages the user. The management role can be defined at the management server. The boost can be a one-time point total, such as 1000 VIP points. Alternatively, the rule can act as a multiplier on VIP points awarded for other boost actions with respect to the manager entity. MyDirectReportBooster, ManagerOrgChainBooster, and other actions can operate similarly.

TemporaryVIPBooster can be used to create temporary boost or detract actions. For example, so long as the user has an open chat or text window with one or more entities in it, local or aggregated VIP scores can be increased for those entities.

JunkSenderFallout can deduct VIP scores for entities whose messages are sent to junk mail. ExternalDomainBooster can boost VIP scores for entities with messages or content coming from particular domains, such as those of valuable clients.

The VIP scoring profile can also include VIP Rank thresholds 430. For example, a VIP threshold can indicate a score or ranking for qualifying as VIP status. A VVIP threshold can likewise indicate a score or ranking for qualifying as VVIP status. The application can use these thresholds to determine various functionality, as discussed above.

Figure 5:
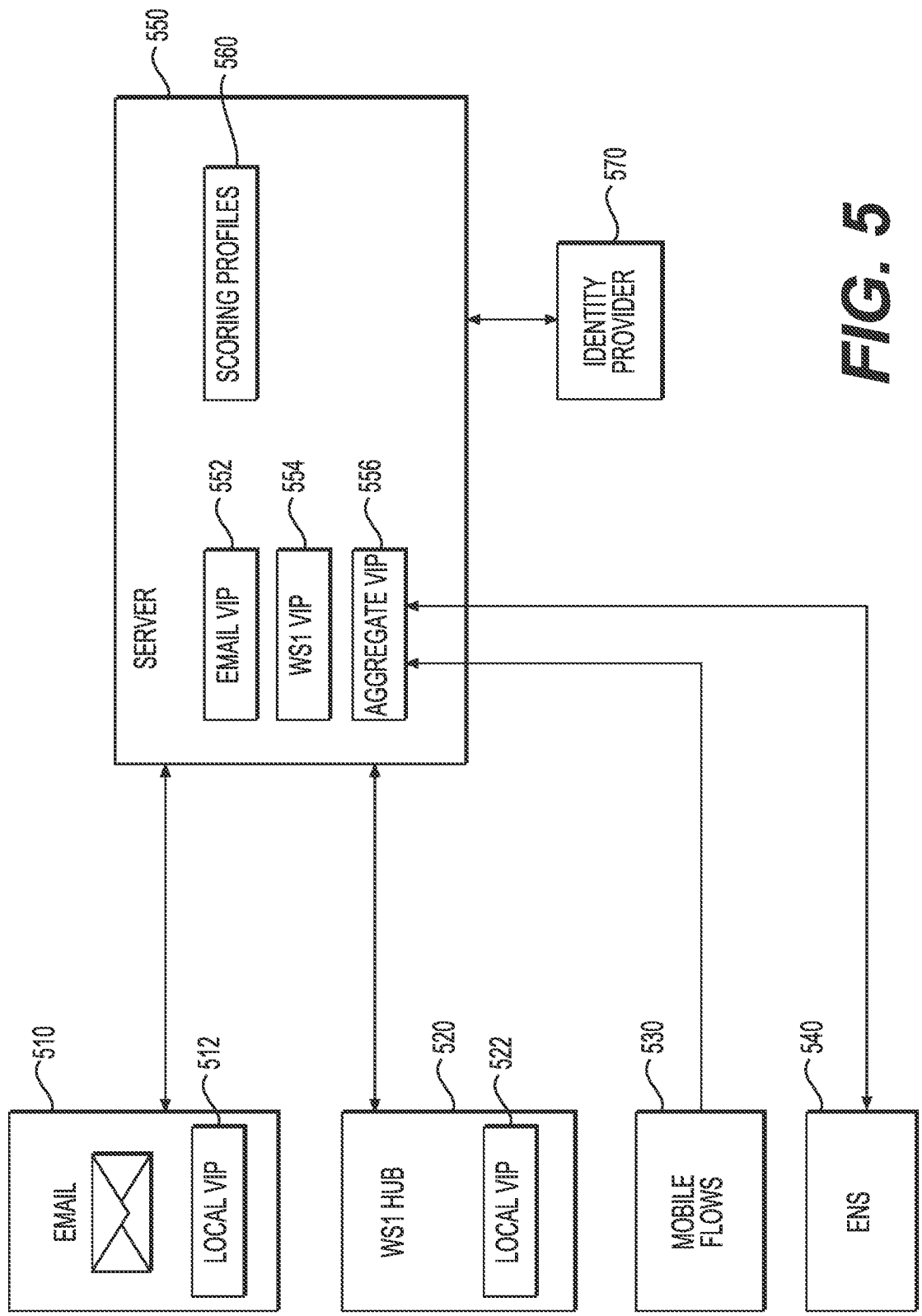
FIG. 5 is an exemplary illustration of system components for contextual notification management.

FIG. 5 is an exemplary diagram of system components. A user device can execute an email application 510 and a second application 520. In this example, the second application is "WS1 Hub." The user device can be any processor-enabled device, such as a laptop, tablet, cell phone, or personal computer. The applications 510, 520 likewise can be any applications that execute on the user device. The applications 510, 520 can be installed locally or run over a network, such as by connecting to a server that executes virtual machines.

The email application 510 can implement a VIP SDK and track local VIP scores 512 for entities associated with emails and other content. Likewise, the second application 520 can implement the VIP SDK and track local VIP scores. In one example, the VIP SDK of both applications 510, 520 can cause the applications 510, 520 to talk to one another and share local VIP scores. The applications 510, 520 can also report the local VIP scores to the management server 550.

A mobile flows server 530 can define connectors for connecting content of one application to others. The mobile flows server 530 can receive requests from applications to make these connections and can also implement a VIP SDK for determining when actions for an entity impact multiple applications or systems. Boost actions can increase VIP scores for those entities. The mobile flows server 530 can then report those VIP scores to the management server 550. These can be considered global VIP scores since they do not originate on the user device.

Similarly, an enterprise network server ("ENS") 540 can implement boost and detract actions to modify VIP scores based on activity on the ENS 540. For example, the ENS 540 can determine some of the same sorts of actions as the email application 510. These global VIP scores can be reported to the management server 550.

The management server 550 can store local VIP scores 552, 554 for specific applications in one example. It can also generate aggregate VIP scores 556 based on local and global VIP scores. Further, the management server 550 can store scoring profiles 560, which can be updated based on administrator input at the console. The management server 550 can be part of an EMM system in one example. Users can enroll in the EMM system and download managed applications 510, 520 that implement the VIP SDK.

In one example, the management server 550 aggregates local and global VIP scores by determining aliases of the entity. The management server 550 can do so by contacting an identity provider 570, in an example. The identity provider 570 can store credentials for users, such as users of an EMM system. In one example, the identify provider 570 stores user credentials and aliases so that the user can perform SSO. The management server 550 can authenticate with the identity provider 570 and send a request for aliases based on an identifier for the entity. For example, an email contact can be sent to the identity provider 570, and the identity provider 570 can return one or more user names or identity tokens, in an example. Using these aliases, the management server 550 can look up other stored global or local VIP scores that correspond to those aliases. Then the management server 550 can create aggregate VIP information 556 based on the VIP scores of the multiple aliases of the entity.

The servers 530, 540, 550, 570 can each be one or more servers with one or more processors. They can operate together on one machine or on multiple machines, depending on the example.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. Additionally, although "VIP score" is used for convenience, a score can equate to a ranking and vice versa. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for contextual notifications, comprising:
   detecting, at a user device, boost actions and detract actions performed by a user at first and second applications, wherein the first and second applications implement a software development kit ("SDK") that defines the boost and detract actions;
   modifying a set of local very important person ("VIP") scores according to the detected boost and detract actions, wherein the local VIP scores are associated with different entities;
   sending the local VIP scores to a server;
   receiving, from the server, a VIP scoring profile that includes scores or rankings of entities based on aggregation of local VIP scores for the entities; and
   changing, at the user device, visibility of first or second application content according to the entity scores or rankings in the VIP scoring profile.

2. The method of claim 1, wherein at least some of the different entities correspond to contacts in the first application, wherein the contacts are used in the aggregation of local VIP scores.

3. The method of claim 1, wherein changing visibility includes declining to display notifications unless they are associated with an aggregate VIP score or rank above a threshold.

4. The method of claim 1, wherein the first application and the second application both use the aggregated VIP information to determine which content to display at the user device.

5. The method of claim 1, wherein the VIP scoring profile defines VIP entities and very VIP ("VVIP") entities, and wherein the SDK causes the first and second applications to change visibility differently based on whether content is associated with an entity that the VIP scoring profile defines as VIP versus VVIP.

6. The method of claim 1, wherein a first boost action increases a local VIP score associated with a contact based on messages sent to the contact, and wherein a first detract action decreases the local VIP score when messages from the contact remain unopened for a threshold period.

7. The method of claim 1, wherein aggregation of the local VIP scores by the server includes:
   determining multiple aliases that correspond to a single entity; and
   for the single entity, aggregating local VIP scores associated with the multiple aliases.

8. A non-transitory, computer-readable medium comprising instructions that, when executed by a processor, perform stages for notification management, the stages comprising:
   detecting, at a user device, boost actions and detract actions performed by a user at first and second applications, wherein the first and second applications implement a software development kit ("SDK") that defines the boost and detract actions;
   modifying a set of local very important person ("VIP") scores according to the detected boost and detract actions, wherein the local VIP scores are associated with different entities;
   sending the local VIP scores to a server;
   receiving, from the server, a VIP scoring profile that includes scores or rankings of entities based on aggregation of local VIP scores for the entities; and
   changing, at the user device, visibility of first or second application content according to the entity scores or rankings in the VIP scoring profile.

9. The non-transitory, computer-readable medium of claim 8, wherein at least some of the different entities correspond to contacts in the first application, wherein the contacts are used in the aggregation of local VIP scores.

10. The non-transitory, computer-readable medium of claim 8, wherein changing visibility includes declining to display notifications unless they are associated with an aggregate VIP score or rank above a threshold.

11. The non-transitory, computer-readable medium of claim 8, wherein the first application and the second application both use the aggregated VIP information to determine which content to display at the user device.

12. The non-transitory, computer-readable medium of claim 8, wherein the VIP scoring profile defines VIP entities and very VIP ("VVIP") entities, and wherein the SDK causes the first and second applications to change visibility differently based on whether content is associated with an entity that the VIP scoring profile defines as VIP versus VVIP.

13. The non-transitory, computer-readable medium of claim 8, wherein a first boost action increases a local VIP score associated with a contact based on messages sent to the contact, and wherein a first detract action decreases the local VIP score when messages from the contact remain unopened for a threshold period.

14. The non-transitory, computer-readable medium of claim 8, wherein aggregation of the local VIP scores by the server includes:
   determining multiple aliases that correspond to a single entity; and
   for the single entity, aggregating local VIP scores associated with the multiple aliases.

15. A system for device notification management, comprising:
   a physical memory storage including instructions; and
   a processor that executes the instructions to carry out stages comprising:
      detecting, at a user device, boost actions and detract actions performed by a user at first and second applications, wherein the first and second applications implement a software development kit ("SDK") that defines the boost and detract actions;
      modifying a set of local very important person ("VIP") scores according to the detected boost and detract actions, wherein the local VIP scores are associated with different entities;

sending the local VIP scores to a server;
receiving, from the server, a VIP scoring profile that includes scores or rankings of entities based on aggregation of local VIP scores for the entities; and
changing, at the user device, visibility of first or second application content according to the entity scores or rankings in the VIP scoring profile.

16. The system of claim 15, wherein at least some of the different entities correspond to contacts in the first application, wherein the contacts are used in the aggregation of local VIP scores.

17. The system of claim 15, wherein changing visibility includes declining to display notifications unless they are associated with an aggregate VIP score or rank above a threshold.

18. The system of claim 15, wherein the first application and the second application both use the aggregated VIP information to determine which content to display at the user device.

19. The system of claim 15, wherein the VIP scoring profile defines VIP entities and very VIP ("VVIP") entities, and wherein the SDK causes the first and second applications to change visibility differently based on whether content is associated with an entity that the VIP scoring profile defines as VIP versus VVIP.

20. The system of claim 15, wherein a first boost action increases a local VIP score associated with a contact based on messages sent to the contact, and wherein a first detract action decreases the local VIP score when messages from the contact remain unopened for a threshold period.

\* \* \* \* \*